United States Patent
Cato et al.

(10) Patent No.: US 6,813,650 B1
(45) Date of Patent: Nov. 2, 2004

(54) MULTIMODE NON-STANDARD UNIVERSAL SERIAL BUS COMPUTER INPUT DEVICE

(75) Inventors: Robert Thomas Cato, Raleigh, NC (US); Phuc Ky Do, Cary, NC (US); Kumar Basalingappa Kori, Cary, NC (US); Thanh Gia Ngo, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/426,855

(22) Filed: Oct. 26, 1999

(51) Int. Cl.$^7$ ............................................. G06F 13/14
(52) U.S. Cl. ........................... 710/14; 710/11; 710/63; 341/22; 345/173
(58) Field of Search ............................ 710/11, 14, 63; 341/22; 345/173

(56) References Cited

U.S. PATENT DOCUMENTS

| | | | |
|---|---|---|---|
| 4,587,634 A | 5/1986 | Ferrio et al. | 364/900 |
| 5,233,167 A | 8/1993 | Markman et al. | 235/375 |
| 5,410,679 A | 4/1995 | Lubold et al. | 395/500 |
| 5,627,530 A | 5/1997 | Israel et al. | 341/21 |
| 5,717,428 A | 2/1998 | Barrus et al. | 345/168 |
| 5,841,424 A * | 11/1998 | Kikinis | 345/168 |
| 5,920,730 A * | 7/1999 | Vincent | 710/14 |
| 5,935,224 A * | 8/1999 | Svancarek et al. | 710/63 |
| 6,044,428 A * | 3/2000 | Rayabhari | 710/305 |
| 6,056,193 A * | 5/2000 | McAuliffe et al. | 235/380 |
| 6,168,077 B1 * | 1/2001 | Gray et al. | 235/375 |
| 6,317,061 B1 * | 11/2001 | Batra et al. | 341/22 |
| 6,321,281 B1 * | 11/2001 | Fujikawa | 710/73 |
| 6,334,160 B1 * | 12/2001 | Emmert et al. | 710/11 |
| 6,396,483 B1 * | 5/2002 | Hiller | 345/173 |
| 6,415,342 B1 * | 7/2002 | Wahl et al. | 710/100 |
| 6,434,644 B1 * | 8/2002 | Young et al. | 710/63 |
| 6,442,734 B1 * | 8/2002 | Hanson et al. | 716/4 |
| 6,633,933 B1 * | 10/2003 | Smith et al. | 710/74 |

* cited by examiner

*Primary Examiner*—A. Elamin
(74) *Attorney, Agent, or Firm*—Jeanine Ray-Yarletts; Winstead Sechrist&Minick

(57) ABSTRACT

A computer system enabled with a Universal Serial Bus data communication interface and a USB enabled input device, such as a computer keyboard, capable of operating in a standard USB mode or in one or more non-standard USB modes. Also disclosed is a method of communicating between the input device and the computer's application program while the device is operating in each mode and a method for switching between operating modes.

23 Claims, 5 Drawing Sheets

Data Flow for the USB-Attached NANPOS Keyboard
(Windows NT Environment)

MULTIMODE NON-STANDARD UNIVERSAL SERIAL BUS COMPUTER INPUT DEVICE

TECHNICAL FIELD

The present invention relates in general to computer input devices, and in particular to keyboards and other devices operating as Universal Serial Bus ("USB") devices which operate in a plurality of modes.

BACKGROUND INFORMATION

Within the past few years, an association of private manufacturers has created a universal standard and method for linking many peripherals to a personal computer simultaneously. This standard is called the Universal Serial Bus (USB). The USB is a communications architecture or "bus" that provides a personal computer with the ability to interconnect to a wide variety of devices or peripherals via a relatively simple cable. The cabled peripherals share USB bandwidth through a host-scheduled, polling based protocol. The bus allows peripherals to be attached, configured, used, and detached while the host and other peripherals are in operation. USB allows for the replacement of peripherals that have previously been attached to special-purpose interfaces and accessed by direct-hardware methods.

Many applications, such as Point-of-Sale ("POS") terminals, use personal computers as a base to support a wide variety of devices, such as scanners, cash drawers, video monitors, printers, and keyboards. In a POS terminal, the keyboard often contains more keys than that of a 112 key keyboard typically used in personal computers (i.e., the "standard keyboard" used to input "conventional keystroke data"). The additional keys of a POS terminal allow for the input of "non-conventional keystroke data" such as cash register commands, and other comments specifically relating to POS terminals. Many of these terminals use standard operating systems such as DOS, Windows 3.11, Windows 9x or Windows NT. These terminals also use a specialized software system or a "mid-level" system of software drivers and programs layered between the operating system and POS application programs. This system of drivers and programs are known by those in the art as Point of Sale Subsystem ("POSS"). They are considered "mid-level" because they are loaded into the computer memory after the operating system has been loaded, but before the application programs have been loaded. The POSS contain the additional drivers and functionality necessary for the control and operation of hardware and equipment unique to the POS terminal environment, such as check scanners and cash register drawers.

Application programs are considered "high level" programs because they are typically loaded after the operating system and the POSS have been loaded (i.e., on top of the operating system). An application program carries out two types of tasks: those related to work being performed, such as accepting text or numbers input related to a sales transaction, and those related to maintenance chores, such as managing files and displaying information on the screen. The maintenance chores are actually performed by the POSS or the operating system in response to a request from the application program. Maintenance chores are considered by those in the art to be lower level functions. Standard application programs are those programs typically running on personal computers, examples include Microsoft WORD or EXCEL. In contrast, specialized application programs are designed to work specifically in the POS environment.

Although the newly-introduced USB provides for integration of many peripherals to a PC, there are problems with non-standard equipment. Existing USB architecture does not accept the additional keys of a POS keyboard nor keyboard data other than normal keystroke data. Thus, USB keyboards cannot be used on POS terminals unless the POS application program is designed to work with a particular keyboard. In other words, each application program must be specifically designed to interface with a variety of POS keyboards, resulting in higher software development, maintenance and support costs. Furthermore, designing an application program to work with a particular keyboard results in a significant loss of flexibility because the application program must be revised whenever a new POS keyboard becomes available.

It is also desirable for a POS keyboard to be able to work in multiple modes, in other words, in one or more modes as a POS keyboard, and in another mode as a standard keyboard. The standard keyboard mode is necessary for updating and loading "lower level" software such as the Basic Input/Output System (i.e., BIOS), the operating system, and diagnostics. Unless the keyboard can function as a standard keyboard, another keyboard will have to be used when updating lower level software. Additionally, such a keyboard should be able to readily switch between the modes of operation.

What is needed, therefore, is a non-standard USB keyboard that will attach to a POS terminal through a standard USB port such that the keyboard mimics a standard USB keyboard. In another mode, the keyboard should allow the recognition of additional POS keys (a POS mode). In yet another mode, the keyboard should permit use of an alternative protocol that communicates through the USB.

SUMMARY OF THE INVENTION

The previously mentioned needs are fulfilled with the present invention. Accordingly, there is provided, in a first form, a computer system (i.e. host computer) comprising a CPU (i.e. computer unit) coupled with a data communication bus interface, an operating system, an applications program, and an input device which communicates with the computer unit through the data communications bus interface by operating in a standard mode, and in at least one non-standard mode. There is also provided a method for communicating between a Universal Serial Bus (USB) device and a software application program running on a host computer where such communication occurs in a USB mode and at least one non-standard USB mode. This method includes creating a non-standard data structure consisting of independent data stacks which bypasses portions of the standard data stack in the operating system running on said host computer.

One embodiment is a computer system using a keyboard that operates in three functional USB modes. The first mode is a standard USB keyboard mode which supports only standard computer keyboard keys and light emitting diodes ("LEDs"). In this mode, the POS function keys are mapped to unusual keys that are included in the USB standards (Universal Serial Bus Specifications, revision 1.1, Sep. 23, 1998), but are not on a standard PC keyboard, such as F13, F14, mute, etc. Such standard keys found in the keyboard in this mode are usable by any software application that does not depend on the POS function keys. Thus, the user can update the BIOS, use DOS or perform other functions without relying on the loading of a relatively high level driver before the keyboard can be used.

The second mode supports standard computer keyboard keys plus POS function keys. This mode is also usable by any application that is selected by the user to be "in focus," To be in focus, from the operator's perspective, is when the application window is "on top" of the other windows. The operator is, therefore, directly interfacing with the window that is "in focus." Key strokes from the keyboard are communicated to the application program through a new software driver that by-passes a portion of the standard operating system USB software stack and then connects back into the standard operating system USB stack. The USB stack subsequently connects to the operating system message queue. A message queue is an ordered line of messages awaiting transmission, from which they are taken up on a first in, first out ("FIFO") basis.

The third mode will support the standard computer keyboard keys plus POS function keys and LEDs, using an alternative protocol that communicates via USB. This mode is only usable by POS sales applications. All keyboard data is communicated through a software driver that communicates directly to the POSS driver. Thus, the communication bypasses all of the standard operating system USB software stack and the standard operating system message queue. In this mode, an operator cannot have access to the terminal's non-POS applications.

The keyboard is able to operate in these modes because of: (1) additional software routines in the keyboard's firmware that allow it to identify itself as a different USB device, and (2) additional software drivers in the host that co-exist with the standard USB drivers (i.e., the drivers that came with the operating system). These additional drivers create additional data stacks in the host's memory to work independently from the standard USB data stack. Additionally, there is also provided a hardware means to force the USB host to renumerate the keyboard as a new device to enable it to switch between the modes.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1–5 of the drawings, in which like numbers designate like parts. In the following description, well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry or operating system software used to control the operation of the various elements described herein are omitted, as such control circuits and software are within the skills of persons of ordinary skill in the relevant art.

Figure 5:
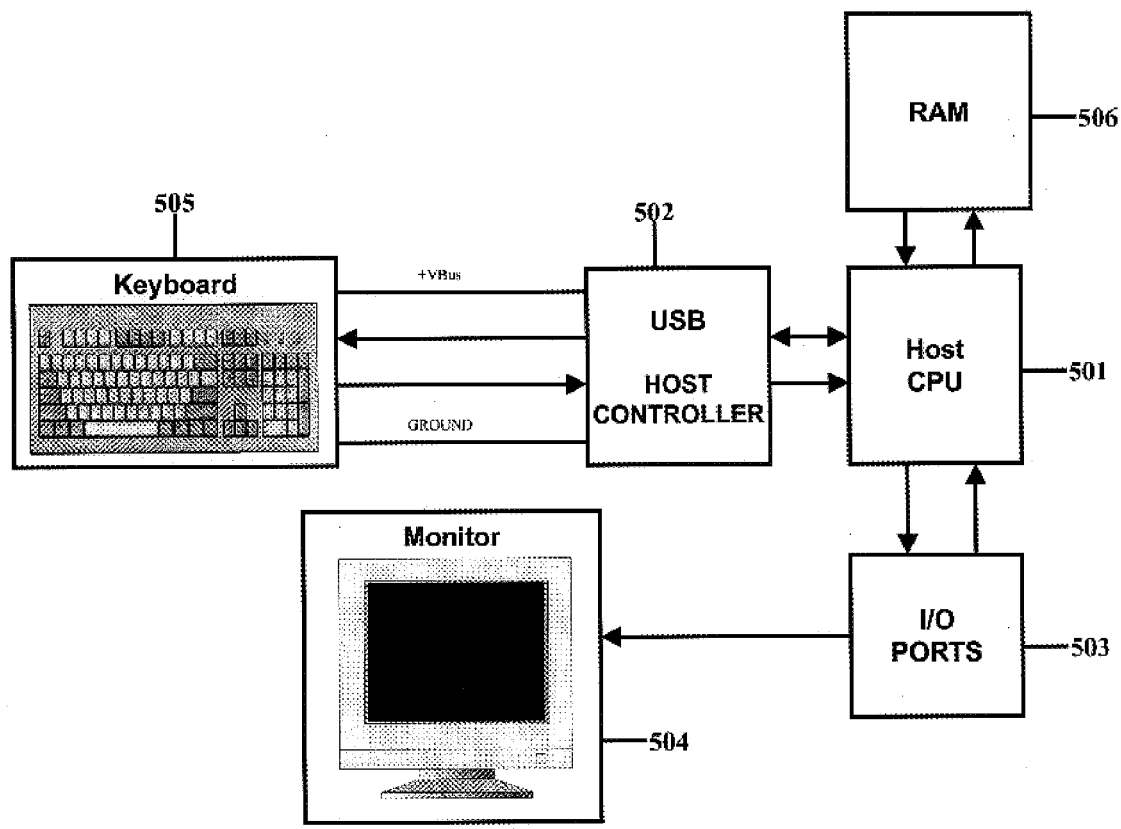
FIG. 5 is a functional block diagram of a host data processing system with a USB interface and a USB enabled keyboard in accordance with an embodiment of the present invention.

As will be explained in more detail below, an embodiment of the present invention is illustrated in FIG. 5 as a personal computer or PC. The computer contains a host computer unit or host central processing unit, ("CPU 501"). CPU 501 reads programs, instructions and data into Random Access Memory or RAM 506. CPU 501 also exchanges data along a data bus with USB host controller 502. USB host controller 502 controls and interfaces with the USB devices connected to its USB network. In this embodiment, USB host controller 502 controls USB enabled keyboard 505. Other non-USB devices, such as monitor 504, hard drives, parallel printers, serial modems, etc. communicate with CPU 501 through input/output or I/O subsystem 503. I/O subsystem 503 contains a number of different ports for communicating with a myriad of computer peripherals. Such ports are familiar to those in the relevant art.

As will be explained in greater detail later, USB host controller 502 allows CPU 501, when the proper drivers and data structures are loaded into RAM 506, to command a USB device to effectively disconnect itself from USB host controller 502 and reconnect as an entirely different device. The hardware interface remains the same, although it appears to the host computer that the original device was disconnected and another USB device plugged in its place. The "new" device communicates with a different part of the USB data stack in RAM 506 through a different USB software interface.

USB protocols can configure devices at startup or when they are plugged in at run time. These devices are broken into various device classes. Each device class defines the common behavior and protocols for devices that serve similar functions. The Human Interface Device ("HID") class consists primarily of devices that are used by humans to control the operation of a computer system. Typical examples are keyboards and pointing devices.

Figure 1:
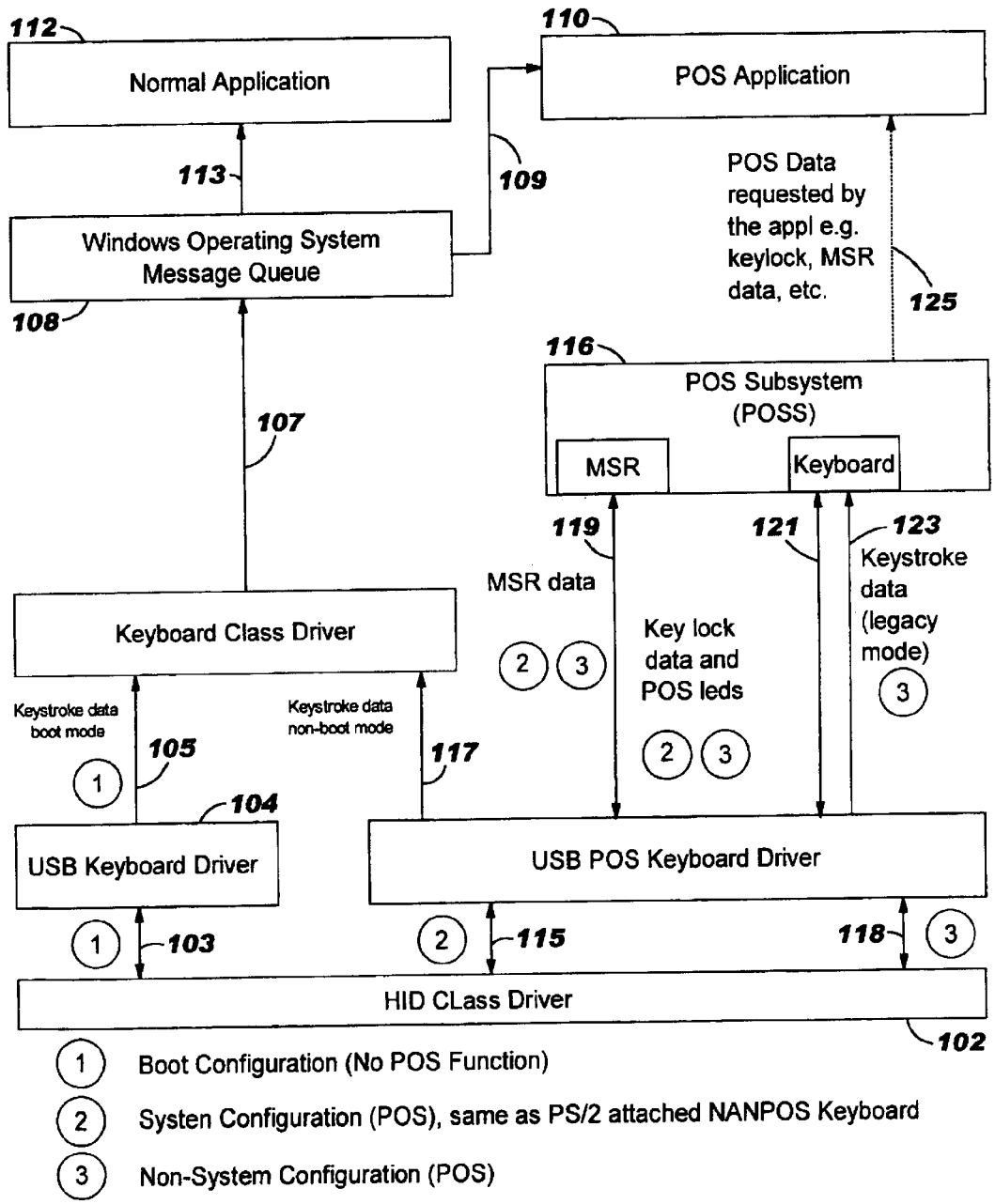
FIG. 1 is a functional schematic view of the data structures and stacks residing in the memory of the host computer in accordance with one embodiment of the present invent

FIG. 1 is functional schematic view of the data stacks created in RAM 506 (FIG. 5) of the host computer. Communication between the application program, the POSS, the operating system, and the microprocessor occurs through a data stack or communication conduit. Data structures are simply organizational schemes, applied to data so that it can be interpreted and so specific operations can be performed on the data by various routines and programs.

A USB/HID class device uses a corresponding HID class driver 102 to retrieve and route all data. As known to those who practice the relevant art, USB data from the USB devices passes to a USB hub or USB host controller or subsystem (USB host controller 502, see FIG. 5) and then into the host computer memory (RAM 506, FIG. 5) through low level programs or drivers, such as HID Class Driver 102. In an environment of a typical operating system, such as in Windows NT, traditional PC keyboards are operated in "boot" mode. "Boot" mode keyboard data is passed through data path 103 to USB keyboard driver 104, which is a standard "operating system" driver designed to interact with keyboards. USB keyboard driver 104 passes keyboard data from the keyboard to USB keyboard class driver 106 through data path 105. USB keyboard driver 104 is the "boot mode" keyboard driver which is usually part of the operating system. This driver does not know or recognize POS specific keystrokes. Keyboard class driver 106 is a driver for the keyboard class. It is designed to handle all keyboard related functions. Although it is operating system specific, it is normally independent from the keyboard bus (e.g., PS/2 or USB). Thus, keyboard class driver 106 is a generic keyboard class driver which supports both USB and system attached keyboards. USB keyboard driver 104, on the other hand, is only used with boot mode USB keyboards. USB keyboard class driver 106 is the default means of operation, allowing the keyboard to operate without any special software drivers.

From USB keyboard class driver 106 the data is sent through data path 107 to the operating system's message queue 108. The operating system communicates to the application programs through messages which are stored in message queues. Message queue 108 is the main input queue for the operating system. It is designed for keystroke data and other input events such as mouse motion, windows sizing or moving events. From the operating system's message queue 108, the data is sent to either a POS application 110 through data path 109 or to a normal (non-POS) application 112 capable of running in an operating system environment. The data path between the operating system's message queue 108 and normal (non-POS) application 112 is data path 113. The data flow from HID Class Driver 102 to non-POS application 112 along data paths 103, 105, 107, and 113 is referred to as a data stack.

This stack defined by data paths 103, 105, 107 and 113 is the standard "Boot Mode" operating system USB stack. Only standard computer key strokes will be passed up through this data stack to the application program. This data stack uses standard operating system drivers. As such, the present invention, when using this stack, behaves as a traditional computer keyboard. Consequently, the computer does not recognize additional POS function keys because standard operating system drivers do not recognize additional POS function keys.

A second "non-boot mode" is defined when standard keystroke data are routed to part of the standard USB stack while POS data, such as magnetic stripe reader (MSR) and POS function data (LEDs, key lock, display, etc.), are routed through new data stacks. In this mode all data is sent from HID Class Driver 102 to USB POS keyboard driver 114 along path 115. USB POS keyboard driver 114 is necessary because of the need to synchronize standard and POS keystroke data. In other words, USB POS keyboard driver 114 is an alternative driver to USB keyboard driver 104. USB POS keyboard driver 114 splits the data according to type into three routes. In the first route, keystroke data bypasses USB keyboard driver 104 and then returns back into Microsoft USB stack at the bottom of keyboard class driver 106. Thus, the data stack for "non-boot" mode keystroke data can be defined by data paths 115, 117, 107, and 109. The second data type, MSR data, is sent along path 119 to the MSR routines in POSS 116. The third data type, the POS function data, is sent along path 121 to the keyboard routines of the POSS 116. POSS 116 sends the MSR and POSS function data to the application program when required along data path 125. USB POS keyboard driver 114, therefore, services the keyboard in the "non-boot" mode (standard PC keys plus POS keys). "Non-boot" mode enables support of standard computer keys and POS keys, in addition to POS functions of the keyboard. The operator, therefore, can run normal application programs in addition to POS application programs.

A third mode ("Legacy Mode") can be defined when all of the keyboard data bypasses the standard drivers and standard USB stack. In this mode, data is sent by HID Class Driver 102 to USB POS keyboard driver 114 along data path 118. USB POS keyboard driver 114 routes all of the keyboard's data traffic around all of the operating system's USB stack (i.e., USB keyboard driver 104, keyboard class driver 106, and the operating system's message queue 108). USB POS keyboard driver 114 routes MSR data to the MSR routines in POSS 116 along data path 119. Key lock data and POS LEDs data are routed along data path 121 to the keyboard routines in POSS 116. Keystroke data is routed along path 123 to the keyboard routines in POSS 116. This mode enables the support of the standard computer keys in addition to the POS keys and any other POS functions of the keyboard. In this mode, the keyboard does not interact directly with non-POS windows programs. The POSS will only interact with a POS application program that has been registered with the POSS. This mode may be advantageous to those users who do not want their operators to access the non-POS application programs of the host computer.

Figure 2:
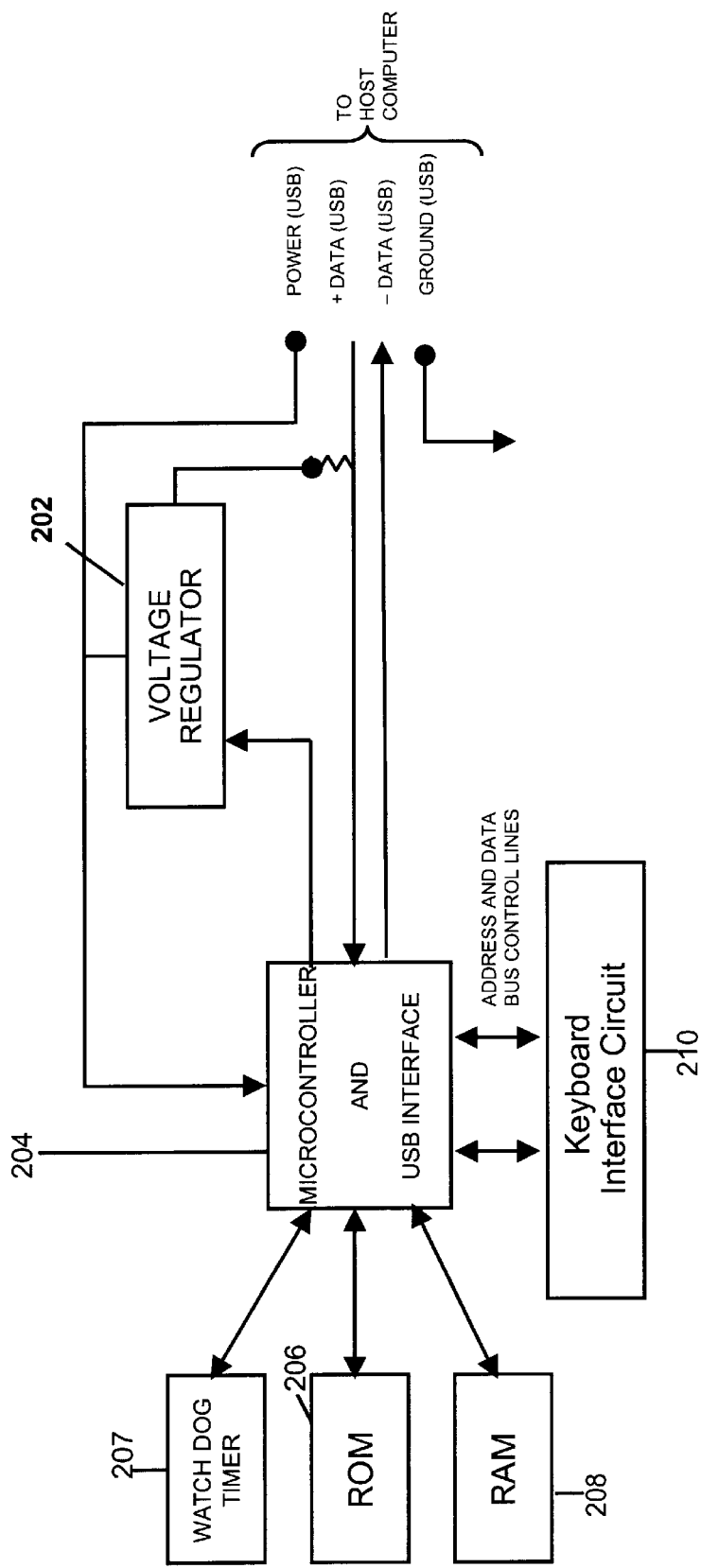
FIG. 2 is a functional block diagram of a USB enabled keyboard in accordance with an embodiment of the present invention.

Referring to FIG. 2, there is shown a block diagram depicting the various internal features of keyboard's 505 (FIG. 5) control system and hardware. The keyboard interacts with host CPU 501 (FIG. 5) via the USB cable. The keyboard includes a number of conventional keyboard components such as a microcontroller/USB interface 204, keyboard switch matrix and keyboard interface circuit 210, digital memory and voltage regulator 202. The digital memory can be flash or Read Only Memory ("ROM") 206, or Random Access Memory or RAM 208. Operation and control of the keyboard is carried out primarily by a microcontroller/USB interface 204 that reads instructions or operating logic from ROM 206. Such stored logic is also known as "firmware". The device includes RAM 208 for storage of information entered by the computer operator and to store program variables used by microcontroller/USB interface 204 during execution.

The embodiment uses microcontroller/USB interface 204 which is a peripheral microcontroller for USB applications. Such microcontrollers have an on-chip USB module. The USB module operates in conjunction with the microcontroller to provide the capabilities of a USB device. Such microcontrollers are well known by those who practice the relevant art. Microcontroller/USB interface 204 also contains watchdog timer 207. Watchdog timer 207 is a circuit that automatically resets microcontroller/USB interface 204 in the event that a firmware operation fails to complete. When enabled by firmware stored in ROM 206, watchdog timer 207 begins running, and unless firmware intervenes, watchdog timer 207 overflows and initiates a chip reset of microcontroller/USB interface 204.

Thus, the microcontroller/USB interface 204 is reset. In normal operation, the firmware periodically clears watchdog timer 207 to prevent the reset.

Keyboard interface circuit 210 operates according to conventional protocol for keyboards for a PC type or POS computer system. Keyboard interface circuit 210 monitors a keyboard switch matrix, and when scanned by microcontroller/USB interface 204 produces keystroke signals corresponding to any key depressed on the keyboard. Such circuits and switch matrixes are well known by those who practice the relevant art.

OPERATION

Figure 3:
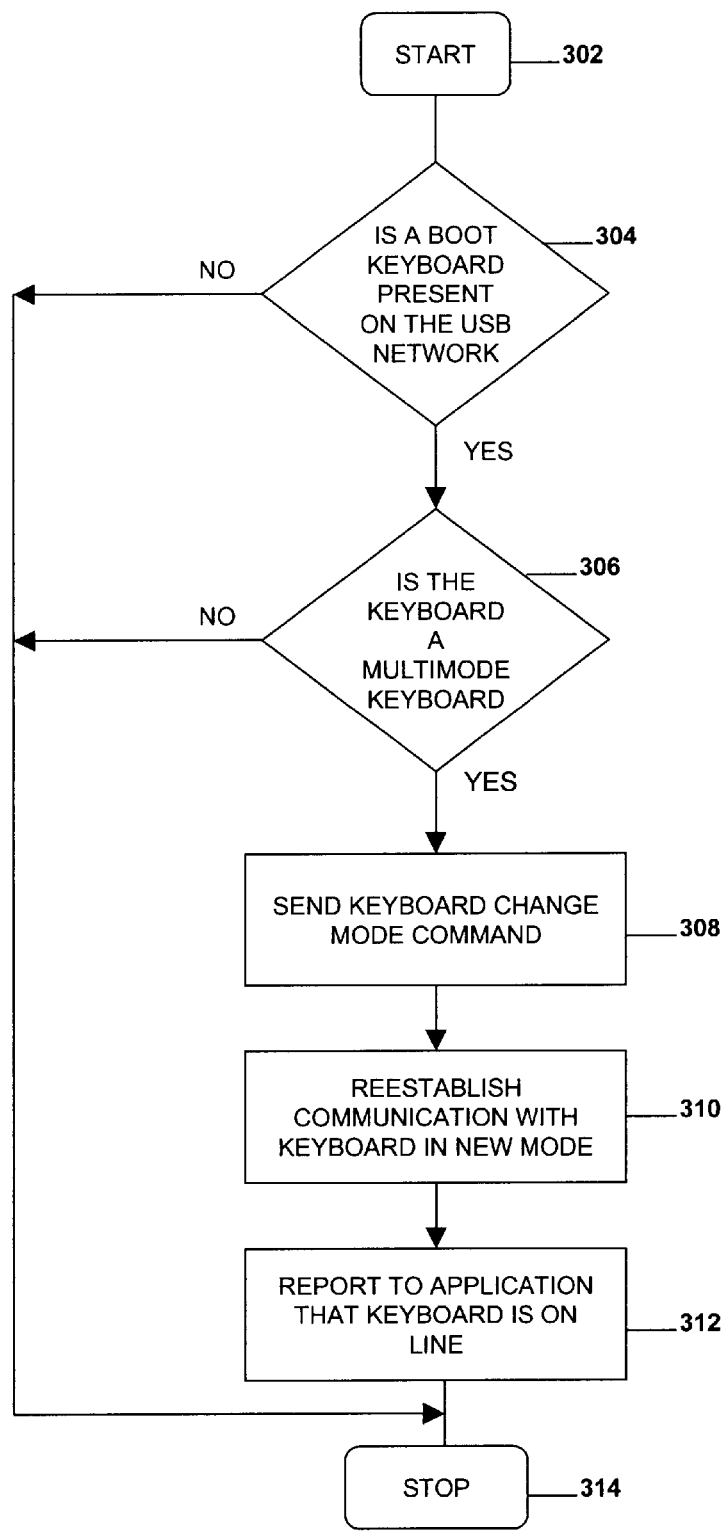
FIG. 3 is a flowchart depicting the mode switching procedures of the USB enabled keyboard in accordance with an embodiment of the present invention.

The manner of using the present invention can be illustrated as shown in FIG. 3. FIG. 3 is a flow diagram depicting operation of the device of the present invention. The steps set forth in FIG. 3 represent instructions or sets of instructions, typically contained in USB POS keyboard driver 114 which is read into RAM 506 (FIG. 5) from a digital memory storage device, such as a hard drive. Execution commences in step 302 when this particular routine is called by USB POS keyboard driver 114. A preliminary search in step 304 determines if there are any standard (boot) keyboards reporting to the USB. If there are, step 306 determines if any of these keyboards are a multimode keyboard by examining the device descriptor sent by the keyboard. If the determination in step 304 or step 306 is negative, a multimode keyboard is not present, and the rest of the routine is skipped. Thus, the host computer operates in mode one ("boot mode") and uses standard drivers data stacks and structures. On the other hand, if a multimode keyboard is present, CPU 501 (FIG. 5) sends a change mode command to the multimode keyboard in step 308. At step 308, the multimode keyboard executes a routine illustrated in FIG. 4 in which it effectively removes itself from the USB network and then reconnects to the network. The keyboard then identifies itself as another USB device, a POS keyboard. Thus, in step 310, the POS keyboard is detected (notified by the underlying Plug and Play infrastructure of the operating system). In step 312, HID Class Driver 102 (FIG. 1) can report to the application(s) that the keyboard is ready to use (i.e. the device is on-line). At step 314, the keyboard mode switch procedures have been completed and execution of normal procedures and the application program continues.

Figure 4:
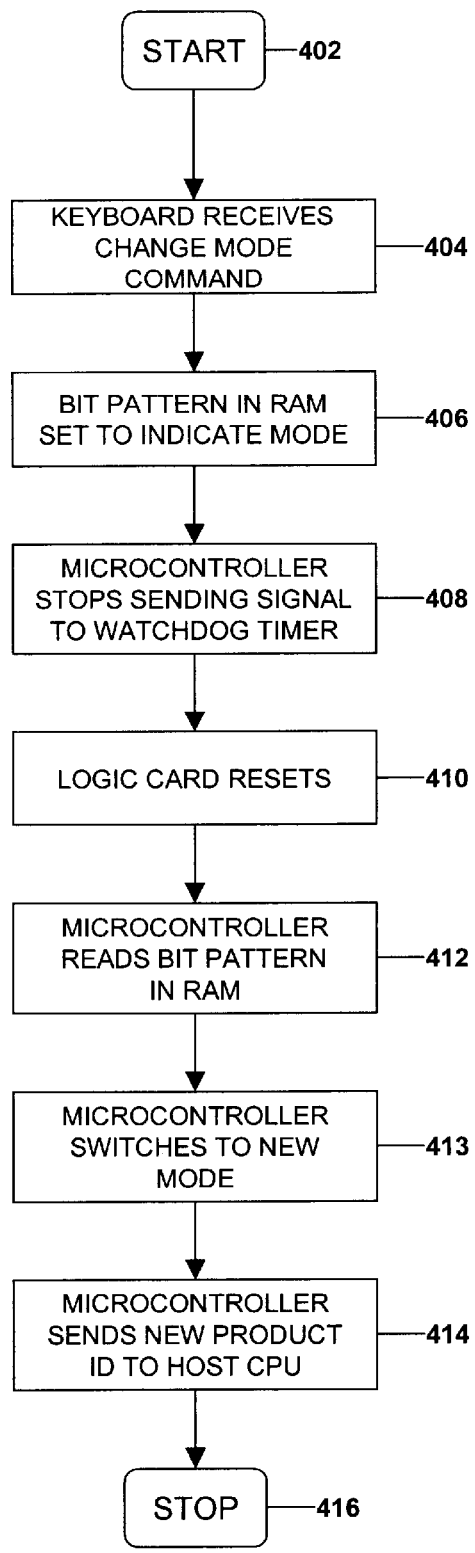
FIG. 4 is a flowchart depicting the mode switching procedures of the firmware loaded into the memory of the keyboard in accordance with an embodiment of the present invention.

The keyboard's response to the host computer change mode command is illustrated in the flow diagram in FIG. 4. The steps set forth in FIG. 4 represent instructions or sets of instructions typically read from digital memory such as ROM 206 (FIG. 2). Execution of the procedure begins at step 402. In response to a signal from the CPU 501 (step 308, FIG. 3), microcontroller/USB interface 204 receives a mode change command in step 404. In step 406, microcontroller/USB interface 204 then sets a bit pattern in RAM 208 to indicate what the next mode should be (to match the mode and data structure set in CPU 501). In step 408, microcontroller/USB interface 204 then stops sending the intervening maintenance signals to watchdog timer 207 (FIG. 2), consequently, watchdog timer 207 overflows and initiates a chip reset in step 410. After the reset, microcontroller/USB interface 204 reads the bit pattern in RAM 208 to determine which mode to assume (step 412). Based on the determination in step 412, microcontroller/USB interface 204, switched to the new mode (step 413) then sends a new device description or identification code to the host computer in step 414. In other words, the keyboard renumerates itself with CPU 501. Each mode has a different device description, so CPU 501 treats the keyboard as a different device. Communication is, therefore, reestablished with the host computer as a new device (step 310, FIG. 3) and the keyboard's change mode routine ends at step 416.

In sum, the multimode USB device has several substantial advantages over the prior art. Among other features, the device can function in multiple modes. This allows the recognition of non-standard keys recognized on the hardware driver level and not the application level or both. Previously USB POS keyboards required the modification of the application program. Designing each application program to function with a particular keyboard resulted in higher software development, maintenance and support costs. Furthermore, designing an application program to work with a particular keyboard results in a significant loss of flexibility because the application program must be revised whenever a new POS keyboard becomes available.

The multimode operation also allows a POS keyboard to be recognized as a standard keyboard. The standard keyboard mode is necessary for updating and loading "lower level" software such as the Basic Input/Output System (i.e., BIOS) and the operating system. Unless the POS keyboard can function as a standard keyboard, another (standard) keyboard must be used when updating lower level software.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It is therefore, contemplated that the claims will cover any such modifications or embodiments that fall within the true scope of the invention.

What is claimed is:

1. A computer system comprising:
   a computer unit;
   a data bus coupled to said computer unit;
   a computer device coupled to said data bus for communication with said computer unit;
   a first mode means for enabling said computer device to communicate with said computer unit over said data bus with a first set of functions;
   a second mode means for enabling said computer device to communicate with said computer unit over said data bus with a second set of functions;
   an operating system running on said computer, wherein said operating system is capable of running standard application programs; and
   a specialized software system running simultaneously with said operating system on said computer unit such that said specialized software system enables specialized application programs to run on said computer unit,
   wherein said computer device is a computer keyboard with means for inputting conventional keystroke data and non-conventional keystroke data,
   wherein said second set of functions include a means for sending conventional keystroke data to said standard application programs and non-conventional keystroke data to specialized application programs.

2. The computer system of claim 1, further comprising a third mode means for enabling said computer device to communicate with said data bus with a third set of functions.

3. The computer system of claim 1, wherein said first set of functions include a means for sending conventional keystroke data to said standard application programs through said data bus.

4. The computer system of claim 2, wherein said third set of functions include a means for sending conventional keystroke data and non-conventional keystroke data to specialized application programs.

5. The computer system of claim 1, wherein said data bus is a Universal Serial Bus.

6. A computer system comprising:
   a computer unit;
   a data bus coupled to said computer unit;
   a computer device coupled to said data bus for communication with said computer unit;

a first mode means for enabling said computer device to communicate with said computer unit over said data bus with a first set of functions;

a second mode means for enabling said computer device to communicate with said computer unit over said data bus with a second set of functions;

an operating system running on said computer, wherein said operating system is capable of running standard application programs; and a specialized software system running simultaneously with said operating system on said computer unit such that said specialized software system enables specialized application programs to run on said computer unit, wherein said computer device is a computer keyboard with means for inputting conventional keystroke data and non-conventional keystroke data, wherein said second set of functions include a means for sending conventional keystroke data to said standard application programs and non-conventional keystroke data to specialized application programs, wherein said computer keyboard comprises:

a memory storage;

a microcontroller which reads operational logic from said memory storage;

a data bus interface coupled to said microcontroller; and a keyboard interface circuit coupled to said microcontroller, wherein said memory storage further comprises:

a random access memory for storing information to be sent to said host computer; and a digital memory containing operating logic, wherein said operating logic comprises a means for communicating with said data bus when said computer device is operating in said first mode means, said second mode means, and said third mode means and a means for switching between said modes, wherein said means for switching comprises a means in said microcontroller of said keyboard for setting a bit pattern in said keyboard's random access memory to set a new mode, a means for resetting said microcontroller, a means to read said bit pattern from said random access memory, and a means to send a new identification code to said host computer based on said bit pattern.

7. A computer system comprising:

a computer unit;

an operating system running on said computer unit capable of running standard application programs;

a specialized software system running simultaneously with said operating system which is capable of running specialized application software;

a data bus coupled to said computer unit;

a keyboard with conventional keys and non-conventional keys coupled to said data bus;

circuitry for enabling said keyboard conventional keys to communicate with said computer unit in a first mode over said data bus, wherein codes for said conventional keys are provided to said standard application programs in a first mode;

circuitry for enabling said keyboard conventional keys to communicate with said computer unit in a second mode over said data bus, wherein said codes for said conventional keys are provided to either said application programs and or said specialized application software, and wherein codes for enabling said non-conventional keys are provided to communicate with said specialized application software in a second mode; and circuitry for enabling said keyboard to communicate with said computer unit in a third mode wherein said conventional keys and said non-conventional keys to communicate are only provided to with said specialized application software in a third mode.

8. The computer system of claim 7, wherein said data bus is a Universal Serial Bus.

9. The computer system of claim 7, wherein said computer keyboard comprises:

a memory storage;

a microcontroller which reads operational logic from said memory storage;

a data bus interface coupled to said microcontroller; and a keyboard interface circuit coupled to said microcontroller.

10. The computer system of claim 9, wherein said memory storage further comprises:

a random access memory for storing information to be sent to said host computer; and a digital memory containing operating logic.

11. The computer system of claim 10, wherein said operating logic comprises circuitry for communicating with said data bus when said computer unit is operating in said first mode, said second mode, and said third mode, and circuitry for switching between said modes.

12. The computer system of claim 11, wherein said circuitry for switching between said modes comprises circuitry for setting a bit pattern in said random access memory to set a new mode, circuitry for resetting said microcontroller, circuitry to read said bit pattern from said random access memory, and circuitry to send a new identification code to said host computer based on said bit pattern.

13. A Universal-Serial-Bus-compatible device for inputting data to a host computer, comprising:

a Universal Serial Bus (USB) mode; and an on-board device controller having a control system coupled to said USB mode, said control system having a standard USB mode and a non-standard USB mode, wherein said operational logic comprising circuitry for communicating with said USB mode when said computer unit is operating in a first mode, a second mode, and a third mode, and a circuitry for switching between said modes, wherein said circuitry for switching comprising circuitry for setting a bit pattern in said memory storage to set a new mode, circuitry for resetting said microcontroller, circuitry to read said bit pattern from said memory storage, and circuitry to send a new identification code to said host computer based on said bit pattern.

14. An information handling system configured to operate in one of three functional USB modes:

1) a standard system USB boot keyboard mode that supports only standard computer keyboard keystrokes;

2) a system non-boot USB keyboard mode that supports standard computer keyboard keystrokes and point-of-sale ("POS") keystrokes; and 3) a non-system, non-boot USB keyboard mode that supports standard computer keyboard keystrokes and POS keystrokes.

15. The system as recited in claim 14, wherein the standard system USB boot keyboard mode does not support POS keystrokes.

16. The system as recited in claim 14, wherein in the standard system USB boot keyboard mode, a coupled keyboard communicates to an application through an HID class driver, USB keyboard driver, keyboard class driver, and Windows operating system message queue.

17. The system as recited in claim 14, wherein in the system non-boot USB keyboard mode, a keyboard coupled to the system communicates through an HID class driver, USB POS keyboard driver, keyboard class driver, and Windows operating system message queue to a POS application and non-POS application.

18. The system as recited in claim 17, wherein in the system non-boot USB keyboard mode, the USB POS keyboard driver also communicates with a POS subsystem.

19. The system as recited in claim 14, wherein in the non-system, non-boot USB keyboard mode, a keyboard coupled to the system communicates only with a POS application.

20. The system as recited in claim 19, wherein the keyboard communicates with the POS application through an HID class driver, USB POS keyboard driver and POS subsystem.

21. The system as recited in claim 20, wherein the non-system, non-boot USB keyboard mode is only usable by the POS application and does not permit keyboard access to non-POS applications.

22. The system as recited in claim 14, wherein the standard system USB boot keyboard mode is activated by any application put in focus by a user.

23. The system as recited in claim 14, wherein the system non-boot USB keyboard mode is activated by any application put in focus by a user.

* * * * *